Aug. 4, 1953     J. E. SHIELDS     2,647,778
ROLL NECK SEAL
Filed Aug. 24, 1949
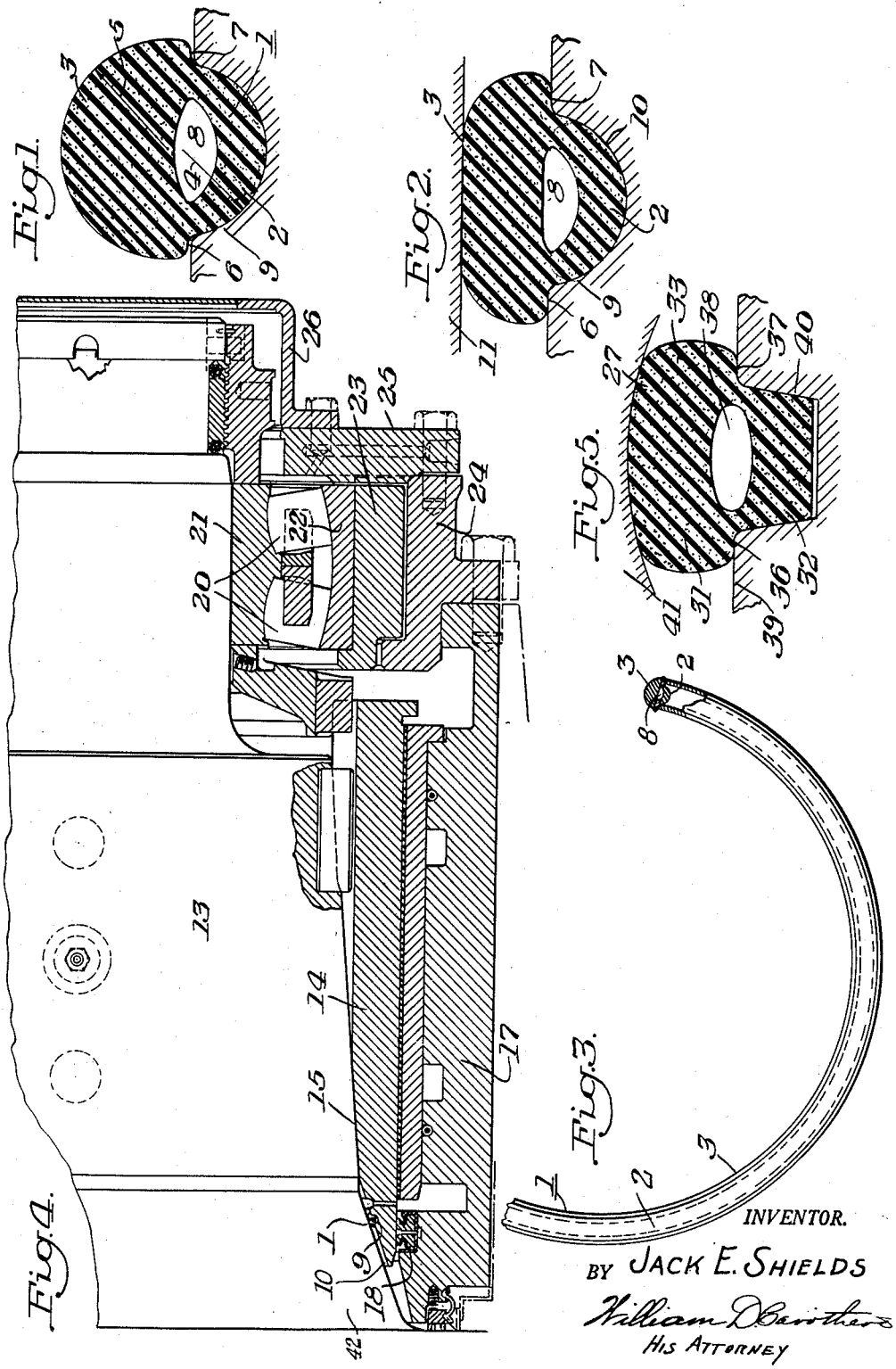
INVENTOR.
BY JACK E. SHIELDS
His Attorney Patented Aug. 4, 1953

2,647,778

UNITED STATES PATENT OFFICE 2,647,778

ROLL NECK SEAL

Jack E. Shields, Mount Lebanon, Pa., assignor to Shields Rubber Company, Pittsburgh, Pa., a corporation of Pennsylvania Application August 24, 1949, Serial No. 112,030

1 Claim. (Cl. 288—19)

This invention relates generally to seals, and more particularly to an annular elastomer for sealing between two coaxially aligned members such as between the neck of a mill roll and the sleeve that forms a part of the bearing assembly which supports the mill roll.

Several different types and shapes of seals have been employed for sealing off the bearing supporting the neck of a steel mill roll to prevent the entry of dust and flying scale, but they have been unsuccessful. The present invention provides an annular elastomer seal which is successful for this purpose and provides one or two annular shoulder seals adjacent a seating or anchoring groove on one member and a capillary seal for the other member. This combination provides a novel neck seal that holds against heavy vibration that accompanies mill work. To increase the flexibility of the seal it may be provided with an annular hollow chamber, the principal plane of which lies substantially in line with the shoulder seals and cooperates therewith to aid in their sealing function.

Other objects and advantages appear in the following description and claim.

The accompanying drawing shows, for the purpose of exemplification without limiting the invention or claim thereto, certain practical embodiments of the invention wherein:

Fig. 1 is a view in cross section showing the seal as a free body;

Fig. 2 is a view similar to Fig. 1 showing the seal under compression;

Fig. 3 is a plan view of the seal shown in Figs. 1 and 2 with parts broken away;

Fig. 4 is a view in longitudinal section showing a roll neck bearing support employing this seal; and Fig. 5 is a cross-sectional view of a modified form of seal.

Referring to Fig. 1, the elastomer seal 1 consists of a body portion 2 and a head portion 3. The circumference of the head portion 3 and the body portion 2 are scribed from constant radii. The radius of the body portion 2 is shorter than that of the head portion 3, as indicated by the radii construction lines 4 and 5. In view of the fact that the radius 5 of the head 3 is the largest diameter, the sides of the head extend beyond the adjacent sides of the body member 2 to form shoulders 6 and 7. The shoulders are connected to the body and head portions by means of reverse curved portions, as indicated on the drawing.

As shown in Fig. 3 the annular elastomer sealing ring is molded with the body portion 2 and the head portion 3 in axial alignment with each other. Thus a twist of approximately 90° must be given to the ring to seat the body portion 2 into the groove 9. This twist in the ring helps to retain the seal in its seat while the roll neck is inserted.

The interior of the elastomer seal is provided with an annular air chamber 8 having its principal axis substantially in line with the shoulders 6 and 7 and its minor axis at 90° to the principal axis and midway between said shoulders. This air chamber can be provided with gas under pressure, although it have been found to function satisfactorily without pressure, being merely a chamber and sealed within the elastomer and capable of collapsing to permit the head to distort under compression, as shown in Fig. 2. The elastomer seal is made of rubber, plastic or any suitable type of elastic and flexible material and has the durometer hardness of near or about 60 and a tolerance of $\frac{1}{64}$ of an inch. It is deemed advisable to employ the chamber, but if the seal is not for fluid pressure it may be made out of a softer rubber or a sponge rubber, the chamber 8 being unnecessary.

As shown in Fig. 2, the seal 1 is under compression. The body 2 being seated into the groove 9 and when under compression is substantially the same as that shown in Fig. 1. However, material pressure is brought to bear from the collapse of the head 3 to extend the shoulders 6 and 7 out over the member 10 that contains the groove 9 and in which the body 2 rests. The other member 11 being sealed is relatively close to the member 10, creating a material compression of the head 3, thus causing it to become distorted and expand laterally and increasing the dimension of the shoulders 6 and 7 and also causing the interior annular chamber 8 to collapse as indicated, thereby providing material force to maintain initial sealing engagement between the members. It will be noted that the member 11 still provides a capillary seal on both sides of the elastomer member with spaces between the member 11 and the head 3 becoming minutely small so that the capillary action of the liquid crowded under pressure between the wall 11 and the seal prevents the passage of the fluid under pressure across the head. The body member 2, being substantially undisturbed, is in fact compressed into the groove 9, as indicated by the chamber 8, being slightly lower in Fig. 2 than that as shown in Fig. 1. Thus, compression of the head 3 not only provides the capillary seal on both sides thereof with the member 11, but also increases the sealing power and length at the shoulders 6 and 7 and maintains the whole of the body substantially in sealed relation with the groove 9, which has been found to be an ideal sealing relation for use in the neck of a mill roll, as shown in Fig. 4, and prevents rolling of the seal from the anchoring groove.

In Fig. 4 the roll is indicated at 12 and is provided with a neck 13 that is conical on some parts and cylindrical on others. As shown, the roll is supported on its neck by the bearings 20 which are assembled in the bearing structure requiring the sleeve 14 which mates in sealing relation with the conical neck of the roll, as indicated at 15, and is locked therewith. The elastomer seal is seated in the groove 9 in the outwardly flaring bore of the sleeve 14. The head of the elastomer seal engages the conical neck 42, as illustrated. The sleeve 14 has no relative movement with the roll neck. However, there is relative movement between the sleeve and the outer casing 17. A double-faced encased seal member 18 is provided between the end of the sleeve 14 and the outer casing 17.

The bearings 20 ride upon an inner race 21 secured to a cylindrical portion of the neck 13 and the outer race 22 is carried by an adaptor 23 that is seated in the bearing head 24, which is mounted on the end of the casing 17 and provided with a closure head 25, together with the cap plate 26.

The structure as shown in Fig. 5 discloses a modified form of seal 31 wherein the body 32 of the seal is not semi-circular in cross section, but its sides are substantially frustoconical relative to each other. When the seal 31 is placed in the groove 39, it does not completely fill the same, leaving a small space in the bottom of the groove that may be completely taken up by the material of the body 32 and thereby relieve some of the functions of the annular chamber 38. The head of the seal has an arcuate top as indicated at 27. However, the sides are arcuate, but not circular. Upon compression of the head 33, the shoulders 36 and 37 will be extended in the same manner as the structure disclosed in Fig. 2. Nevertheless, an increased pressure is brought to bear on each of the shoulders 36 and 37 and when the space in the bottom of the groove is completely filled, a compression type seal is provided on the side of the member 40 and a capillary type seal is produced between the head 33 and the outer member 41.

One of the principal advantages of this type of seal is that any tendency to rock, or otherwise disturb a seal in the groove, merely creates increased pressure on one of the shoulder members or on the shoulder member adjacent the application or in the direction of the rolling pressure, tending to cause the seal to rock about the shoulder rather than to collapse and flow. This increased pressure creates a resistance to the disturbance of movement of the seal and permits the same to hold when subjected to material pressures and also prevents rolling of the seal out of its socket or anchoring groove.

I claim:

An annular elastomer roll neck seal constructed when a free body to comprise an annular body portion the whole of which is cross-sectionally shaped to fit into an annular groove with one end exposed, an annular flexible neck portion integral with and projecting from each side of the exposed end of said body portion, and a head portion integral with both of said neck portions and defining with said body and neck portions a hollow annular take up chamber that permits distortion of said head and neck portions without disturbing said body portion, said head portion extending above and beyond said body portion to form shoulder means in line with said chamber, said head portion flexibly hinging from said neck portions to permit distortion thereof relative to said body portion.

JACK E. SHIELDS.

References Cited in the file of this patent

UNITED STATES PATENTS

| Number | Name | Date |
|---|---|---|
| 1,365,780 | Hammer | Jan. 18, 1921 |
| 1,826,321 | Mitchell | Oct. 6, 1931 |
| 2,265,693 | Knight | Dec. 9, 1941 |
| 2,365,574 | McWane | Dec. 19, 1944 |